United States Patent [19]
Casadio

[11] 3,964,350
[45] June 22, 1976

[54] CABLE STRIPPER

[76] Inventor: Roberto Casadio, Via Molinelli, 37, Bologna, Italy

[22] Filed: Jan. 13, 1975

[21] Appl. No.: 540,758

[30] Foreign Application Priority Data
Jan. 15, 1974  Italy .................................. 3304/74

[52] U.S. Cl. ............................................... 81/9.5 A
[51] Int. Cl.² ........................................... H02G 1/12
[58] Field of Search ...................... 81/9.5 R, 9.5 A

[56] References Cited
UNITED STATES PATENTS

| | | | |
|---|---|---|---|
| 1,151,319 | 8/1915 | Wood .................. | 81/9.5 A |
| 3,146,645 | 9/1946 | Hindenburg ............ | 81/9.5 A |
| 3,422,708 | 1/1969 | Bieganski .............. | 81/9.5 A |
| 3,516,307 | 6/1970 | Krampe ................ | 81/9.5 A |

Primary Examiner—Al Lawrence Smith
Assistant Examiner—Roscoe V. Parker
Attorney, Agent, or Firm—Guido Modiano; Albert Josif

[57] ABSTRACT

Stripper for stripping a cable with one or more conductor wires coated with an insulation sheath. The stripper comprises a pair of levers articulated about an axis and defining two actuation handles and two jaws. A pair of blades are fixed on the jaws and cooperate with each other so as to incise the insulation sheath of the cable in diametrically opposite points when the jaws are approached towards each other. Two cylindrical sections having longitudinally knurled outside surfaces are articulated on the ends of the jaws about axes parallel to the axis of articulation of the levers so that the knurled surfaces are arranged opposite to each other. A pair of fork elements are provided each of which consisting of two articulated arms whose extremities are articulated on the sectors at the center of curvature of the knurled surfaces. A tubular element is hinged about the axis of articulation of the arms of the fork elements. A bushing is associated to the tubular elements and defines a cavity. A rod is hinged about the axis of articulation of the levers and extends axially through the cavity. An annular groove is provided on the rod in the zone of the cavity. A bush is slidable on the rod and has a collar. The bush is received in the cavity and is biased by return spring means.

5 Claims, 5 Drawing Figures

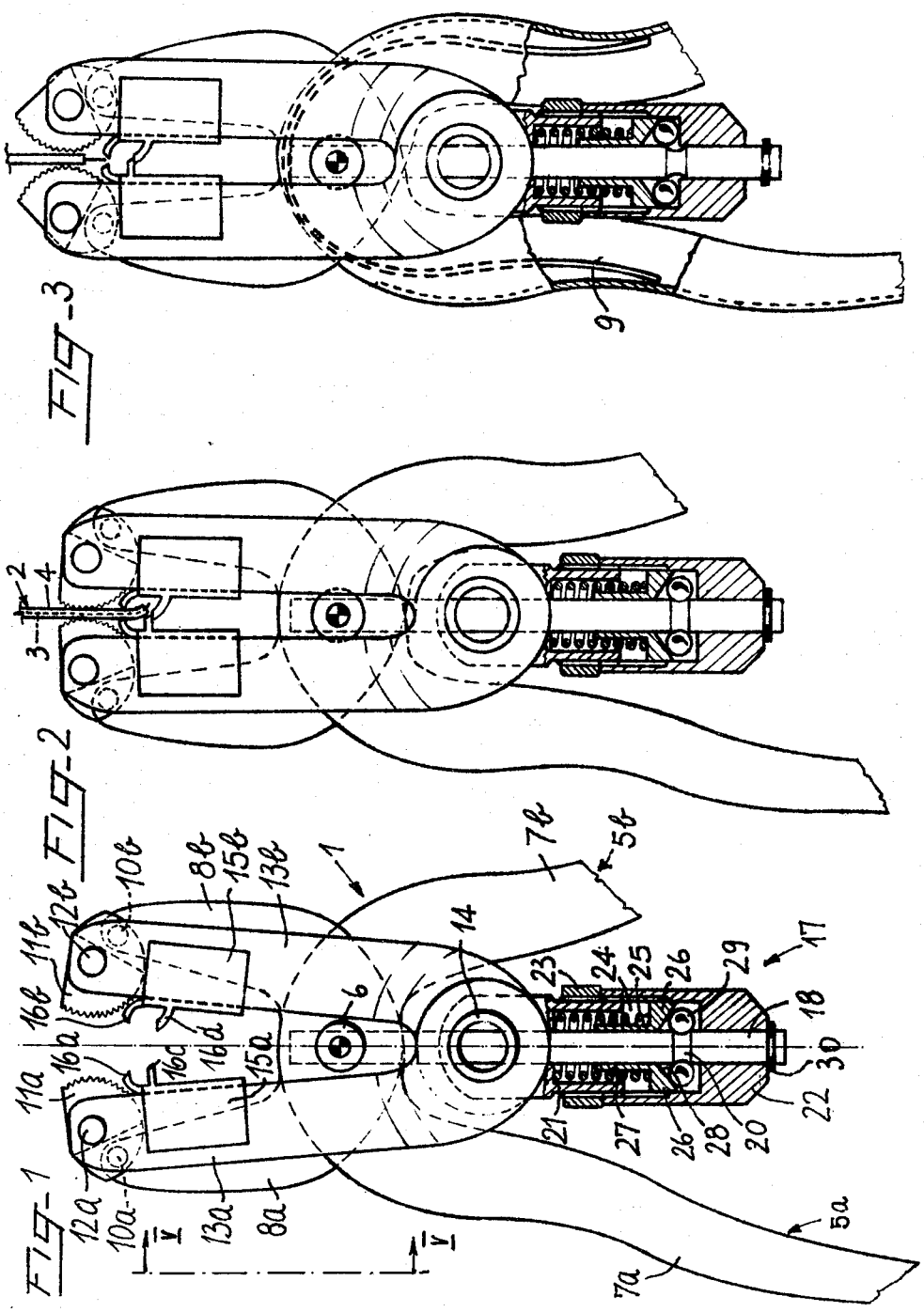

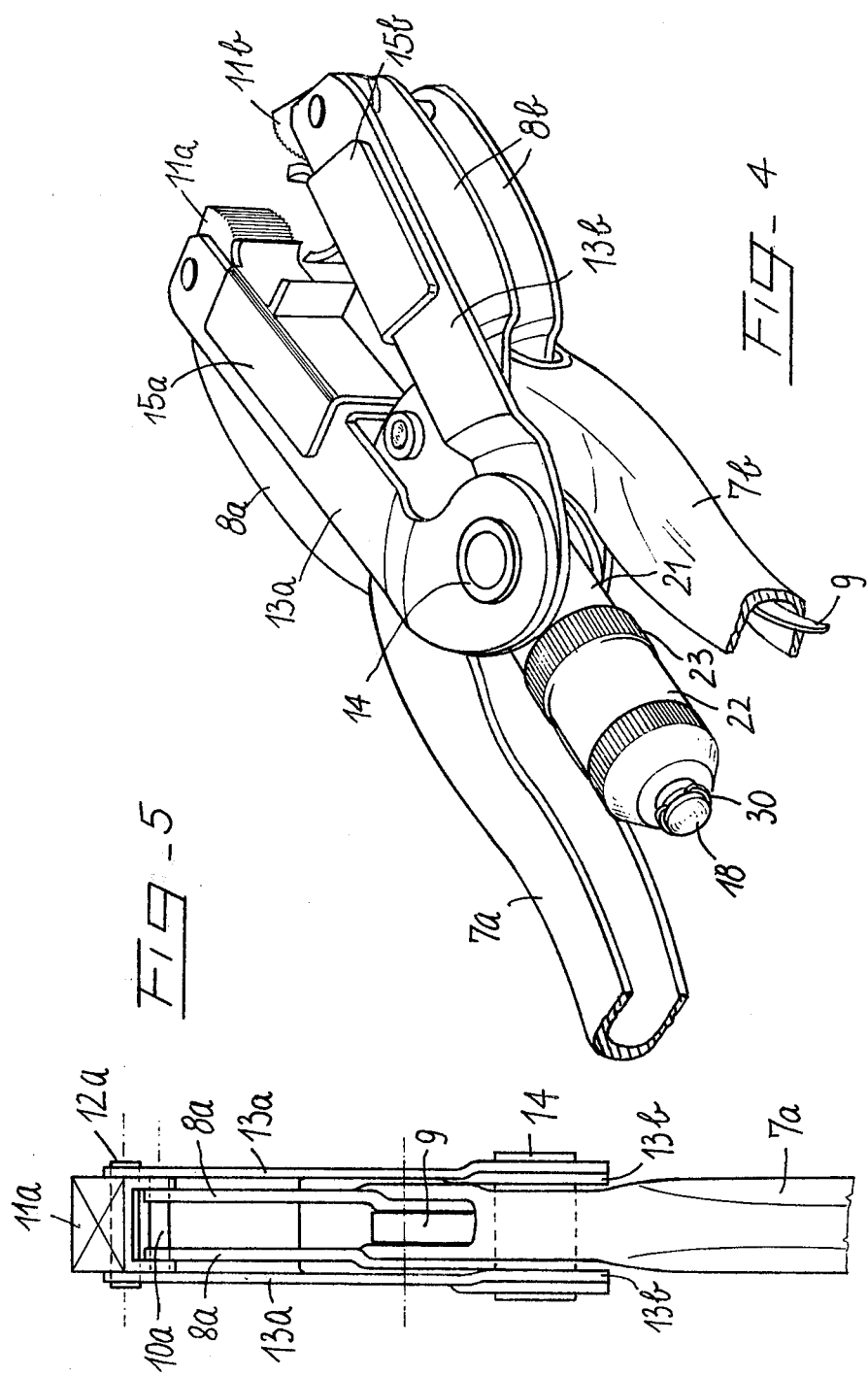

CABLE STRIPPER

BACKGROUND OF THE INVENTION

This invention is concerned with a stripper for cables comprising one or more conductor wires a coating made of an insulating sheath, said stripper comprising a pair of levers articulated about an axis such as to define two actuating handles and two jaws which may be approached towards each other by actuating the said handles against the action of a return spring, a pair of blades fixed on said jaws and cooperating with one another in such a manner as to make an incision into the insulation sheath of the cable which has been inserted therebetween, in diametrically opposite points when the jaws are approached to one another, two cylindrical sectors having longitudinally knurled outside surfaces, said sectors being articulated on the extremities of said jaws about axes parallel to the articulation axes of said levers so that the knurled surfaces are disposed opposite to each other, a pair of fork elements each consisting of two articulated arms the extremities of which are articulated on said sectors at the center of curvature of the knurled surfaces, the arms of the fork elements having a common articulation axis extending between the handles parallel to the axis of articulation of the levers, the line which joins the articulation points of the cylindrical sectors onto the extremities of the jaws being arranged between the line which joints the articulation points of the sectors onto the extremities of the fork element arms and the axis of articulation of the levers.

With a cable stripper of this kind, the cable which has to be stripped on its ends is grasped by the cylindrical sectors and is incised by the blades in diametrically opposite points. By actuating the stripper the sectors entrain the cable towards the outside with respect to the blades which in turn retain the extremities of the incised sheath thereby stripping the latter from the conductor wires.

These known strippers have two essential drawbacks. First of all it is not possible to regulate the pressure with which the cylindrical sectors engage the cable, so that the efficiency with which the cable is dragged or entrained away with respect to the incision blades is not always optimum in respect to the diameter of the cable and in respect to the consistency of the material of which the insulation sheath is made. Furthermore, it is not possible with the known strippers to establish the length of the sheath portion which has to be stripped, unless an accurate positioning of the cable with respect to the stripper is made. To these drawbacks the shortcomings have to be added, which derive from the complex lever system through which the motion of the cylindrical sectors is transmitted, this lever system rendering the stripper very heavy.

SUMMARY OF THE INVENTION

An object of this invention is therefore to provide an improved stripper which removes the above shortcomings and drawbacks.

This object is attained with a stripper of the described kind, which is characterized in that it furthermore comprises a tubular element hinged about the axis of articulation of the arms of the fork elements, a sleeve associated to the said tubular element and defining therewith a cavity, a rod hinged about the axis of articulation of the levers and passing axially through said cavity, an annular groove provided on said rod in the zone of said cavity, a slidable bush on said rod and having a collar, said bush being received in said cavities and biased by return spring means, said collar being formed so as to retain a plurality of balls disposed in said cavity and engaging said groove.

BRIEF DESCRIPTION OF THE DRAWING

Further details of the invention will appear from the accompanying drawings which show one embodiment of the invention. In the drawing:

FIGS. 1, 2 and 3 show the stripper in three different operative positions;

FIG. 4 shows a perspective view of the terminal portion of the stripper, and

FIG. 5 shows a view of the stripper according to line V—V of FIG. 1.

DESCRIPTION OF A PREFERRED EMBODIMENT

In the drawing reference numeral 1 generally indicates the stripper for stripping a cable 2 consisting of one or more metallic wires coated by an insulation sheath 4. The stripper 1 comprises two levers 5a, 5b which are made of sheet metal and which are articulated to each other by means of the pivot 6 so as to define with respect thereto actuation handles or grips 7a, 7b and jaws 8a, 8b. The grips 7a, 7b have a U-like cross-section which is open inwards, whereas the jaws 8a, 8b are made each of a pair of flat parallel members.

Between the grips 7a, 7b a spring 9 is arranged, which is wound about the pivot 6 and which, by acting on the grips, maintains the stripper in open position. Formed in the extremities of the jaws 8a, 8b are holes in which pivots 10a, 10b are fixed, which operate as articulation pivots for two cylindrical sectors 11a, 11b, the outside surfaces of which are knurled longitudinally with respect to the cylindrical extension. The pivots 10a, 10b extend through the cylindrical sectors 11a, 11b in positions offset with respect to the center of the cylindrical sectors, i.e. with respect to the center of curvature of the cylindrical surfaces of the sectors.

Extending through the centers of the sectors 11a, 11b are pivots 12a, 12b the ends of which project on opposite sides of the sectors. Articulated on said ends are the ends of arms 13a and 13b of a pair of forks made likewise of sheet metal. The arms 13a and 13b which form the forks are articulated on the sleeve 14 and are arranged outside with respect to the jaws 8a, 8b. Fixed by means of not shown screws on the arms 13a of the two forks is a bracket 15a which has a blade 16a cooperating with a counterblade 16b of a bracket 15b fixed on arms 13b. The blade 16a and the counterblade 16b are designed for making incisions in the sheath of the cable 2 to be stripped.

Provided on the brackets 15a and 15b are in addition two blades 16c and 16d which, upon actuation of the stripper, work like shears cutting the cable at a pre-established distance from the point of incision. Indicated generally with reference numeral 17 are means which allow rotation of cylindrical sectors 11a, 11b when the latter, during the closure of the stripper, engage with the necessary pressure the insulation sheath of the cable 2.

Means 17 comprise a cylindrical rod 18 which with one end thereof extends diametrically through the pivot 6 on which it is connected by means of a gudgeon pin 19. On the other end thereof the rod 18 has an annular groove 20 having a semicircular cross-section.

The rod 18 is slidable lengthwise within a tubular element 21 which is articulated on the sleeve 14. On the tubular element 21 a bush 22 is screwed through which the rod 18 extends axially. 23 indicates a ring nut for locking the bush 22 on the tubular element 21. Between the element 21 and the bush 22 and the rod 18 a cavity 24 is left free within which a compression spring 25 is arranged, which on the one side abuts against the tubular element 21 and with the other side acts on the collar 26 of a bushing 27 slidably guided on the rod 18. The collar 26 has a face turned towards the bottom of bush 22 which forms a frustoconical cavity 28 which has the form approximately like a funnel.

By virtue of the action of the spring 25 the collar 26 rests against a plurality of balls which are arranged about the rod 18 and engage the annular groove 20. The stripper further comprises a resilient ring 30 for the axial retention of the rod 18.

The operation of the stripper is as follows.

The cable to be stripped is inserted between the sectors 11a, 11b and the blades 16a–16d of the stripper so that the end thereof project beyond the blades 16c, 16d. Thereafter one acts on the grips of the stripper so as to bring the sectors 11a, 11b in engagement with the cable. When the sectors are in contact with the cable, the end thereof is truncated by the blades 16c, 16d, whereas the blades 16a, 16b incise the sheath. By acting further on the grips a rotation of the sectors 11a, 11b, is determined about the pivots 12a, 12b whereas simultaneously the jaws 8a, 8d approach to each other and push outwards the sectors 11a, 11b which drag the arms 13a, 13b articulated thereon and the cable on which the latter are clamped. The cable 2 is thus moved away with respect to the blades 16a, 16b which retain and thereby strip off the portion of the insulation sheath comprised between the blades 16a, 16b and 16c, 16d. It should be noted that the movement of the arms 13a, 13b with respect to the jaws 8a, 8b causes the pin 6 and the sleeve 14 to approach each other and causes thereby the rod 18 to move out of the bottom of the bushing member 22. The force with which the stripper has to be actuated in order to cause the balls 29 to leave the annular groove 20 depends on the force with which the balls 29 are maintained in engagement within the said groove. This force depends on the compression action of the spring 25 and consequently on the intensity with which the bushing 22 has been screwed on the tubular element 21. It will be understood that the closure of the stripper, i.e. the approaching movement of the jaws 8a, 8b and the rotation of the sectors 11a, 11b will take place only when the pressure exerted by the sectors on the cable exceeds a pre-established value which is essentially determined by the strength required in order to expell the balls 29 from the groove 20 against the action exerted thereon by the collar 26.

In practice, with the above described means it is possible to vary the pressure of the sectors 11a, 11b on the cable depending on the thickness of the latter and on the consistency of the material of which the sheath of the cable is made. For instance, if it is desired to strip off a cable having a size greater than that shown in the drawing or if it is desired to strip off a flat cable having several parallel conductor wires, where the traction strength to be applied in order to strip off the terminal portion of the insulation sheath is greater, it will be necessary to increase the compression of the spring, in order to increase adequately the pressure with which the sectors 11a, 11b engage the cable so as to avoid slippage of the sectors on the cable and in order to ensure an efficient stripping action.

According to a modification of the invention the brackets 15a, 15b may be replaced by another type of brackets in which the distance between the incision blades 16a, 16b and the severing blades 13c, 13d is greater or smaller depending on the length of the portion of the insulation sheath whose end is going to be stripped off from the cable.

Advantageously, the severing blades 16d have a curved shape in order to prevent that the removed portions of the sheath may remain entangled between the blades 16a, 16b and 16c, 16d. According to a further modification of the invention, the brackets 15a, 15b have near the fulcrum of the stripper further blades cooperating among each other and perpendicular to said fulcrum. Such blades may act as conventional cutting clippers.

I claim:

1. Stripper for stripping a cable with one or more conductor wires coated with an insulation sheath, said stripper comprising a pair of levers articulated about an axis and defining two actuation handles and two jaws approachable towards each other when said handles are actuated against the action of a return spring, a pair of blades fixed on said jaws and cooperating with each other so as to incise the insulation sheath of the cable in diametrically opposite points when the jaws are approached towards each other, two cylindrical sectors having longitudinally knurled outside surfaces, said sectors being articulated on the ends of said jaws about axes parallel to the axis of articulation of the said levers so that the knurled surfaces are arranged opposite to each other, a pair of fork elements each of which consisting of two articulated arms whose extremities are articulated on said sectors at the center of curvature of the knurled surfaces, the arms of the fork elements having a common articulation axis extending between the said handles and parallel to the axis of articulation of said levers, the line which joints the articulation points of the cylindrical sectors on the extremities of the jaws being disposed between the line which joints the articulation points of the said sectors on the extremities of the arms of the fork elements and the axis of articulation of said levers, said stripper being characterized in that it further comprises a tubular element hinged about the axis of articulation of the arms of the fork elements, a bushing associated to said tubular element and defining a cavity, a rod hinged about the axis of articulation of said levers and extending axially through said cavity, an annular groove provided on said rod in the zone of said cavity, a bush slidable on said rod and having a collar, said bush being received in said cavity and biased by return spring means, said collar being formed in such a manner as to retain a plurality of balls arranged in said cavity in engagement within said groove.

2. Stripper according to claim 1, characterized in that it comprises a pair of blades arranged on said jaws between said incision blades and the articulation axis of said levers, said blades cooperating with each other like scissors for truncating the extremity of said cable.

3. A stripper according to claim 1, characterized in that said bushing is screwable on said tubular element and is fixable on the latter by means of a ring nut screwed on said tubular element.

4. A stripper according to claim 1, characterized in that said collar has faces which engage said balls and defining a frustoconical concavity.

5. A stripper according to claim 2, characterized in that one of said blades acting as scissors has curved shape.

* * * * *